United States Patent
Nevarez

(10) Patent No.: US 6,252,201 B1
(45) Date of Patent: Jun. 26, 2001

(54) SMALL FAST ACTING CONVEYOR TOASTER OVEN

(75) Inventor: Roberto Nevarez, Hudson, FL (US)

(73) Assignee: Middleby Marshall Incorporated, Elgin, IL (US)

(*) Notice: Subject to any disclaimer, the term of this patent is extended or adjusted under 35 U.S.C. 154(b) by 0 days.

(21) Appl. No.: 09/478,781

(22) Filed: Jan. 6, 2000

(51) Int. Cl.[7] .............................. A47J 37/04; A21B 1/48; A21B 1/26
(52) U.S. Cl. .................... 219/388; 219/400; 126/21 A
(58) Field of Search .................... 219/388, 400; 126/21 A; 99/386, 443 C

(56) References Cited

U.S. PATENT DOCUMENTS

| | | | | |
|---|---|---|---|---|
| 3,239,651 | * | 3/1966 | Silberman | 219/388 |
| 3,895,215 | * | 7/1975 | Gordon | 219/400 |
| 4,338,911 | * | 7/1982 | Smith | 126/21 A |
| 4,374,319 | * | 2/1983 | Guibert | 219/400 |
| 4,386,558 | * | 6/1983 | Holman et al. | 99/386 |
| 4,924,763 | * | 5/1990 | Bingham | 126/21 A |
| 4,951,648 | * | 8/1990 | Shukla et al. | 126/21 A |
| 5,454,295 | * | 10/1995 | Cox et al. | 99/443 C |
| 5,671,660 | * | 9/1997 | Moshonas | 99/443 C |
| 5,676,044 | * | 10/1997 | Lara, Jr. | 126/21 A |
| 5,832,812 | * | 11/1998 | Wolfe et al. | 99/443 C |

* cited by examiner

Primary Examiner—Joseph Pelham
(74) Attorney, Agent, or Firm—Laff, Whitesel & Saret, Ltd.; J. Warren Whitesel

(57) ABSTRACT

A toaster oven has a double wall housing with an air space between the double walls. The inner one of the double walls has a plurality of openings therein arranged above and below heating elements inside the oven. Inside the oven, an air divertor having a pair of spaced parallel walls is positioned adjacent each opening. One of the spaced plates has perforations so that an air stream in the air space between the double walls is driven through the openings, the space between the parallel plates, and out the perforations. A food product is located to receive the air emerging from the perforations. The individual perforations have a funnel shape in order to concentrate the emerging air and better paint the surface of the food product.

17 Claims, 6 Drawing Sheets

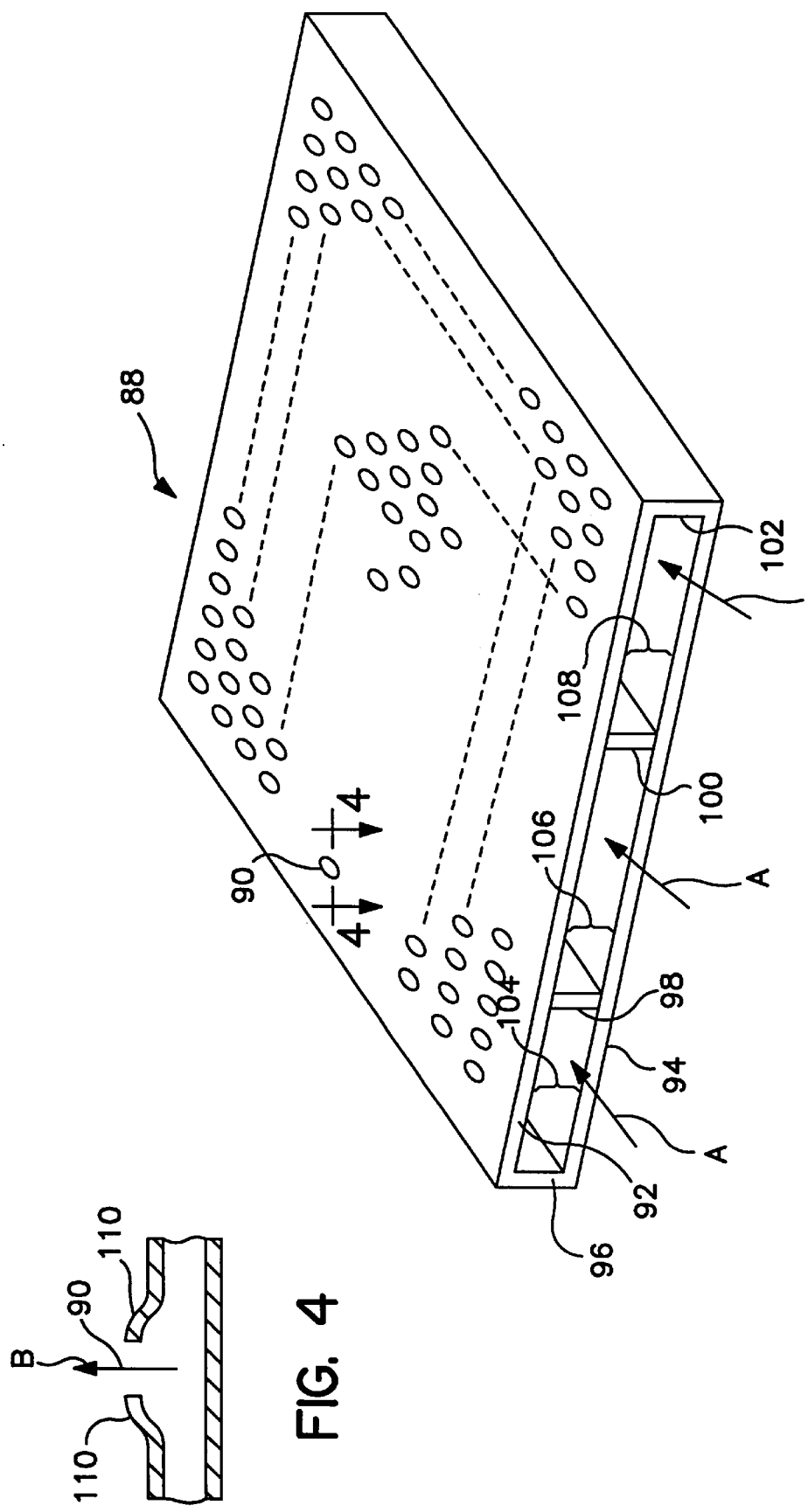

SMALL FAST ACTING CONVEYOR TOASTER OVEN

This is a formal application to replace Provisional Application Ser. No. 60/117,548 filed Jan. 28, 1999.

This invention relates to conveyor ovens and, more particularly, to small ovens for toasting or warming bread or buns in very short time periods, with the flexibility of selectively warming either one or two sides if a food product.

For a general background of similar ovens, reference is made to U.S. Pat. Nos. 4,338,911; 4,386,558; 4,465,701; 4,534,987, and Canadian patent 1,161,269. In general, the invention is concerned with the air flow pattern in a toaster oven. In the inventive toaster oven, the air stream is described as flowing between two spaced parallel side walls in order to keep the side walls, bearings, etc. cool to the touch while utilizing any heat picked up during the air flow in this cooling process in order to augment heat applied to a food product by its primary heat source. The U.S. Pat. No. 4,338,911 relates to a columniated air flow where jets of hot air are blown onto a surface of a food product in order to both cook and produce surface effects thereon.

A second consideration is the cost and versatility of the oven. None of these cited patents addresses combining features such as cooling walls, heating a food product, for example, while concentrating and directing hot air onto the surface of the food product. Costs may be reduced by having a minimum number of parts, which serve multiple functions, such as toasting both side of a slice of bread or warming just the bottoms of buns.

In keeping with an aspect of the invention, these and other features may be accomplished by providing separately controlled upper and lower heaters in association with two spaced parallel plates forming an air flow member. One of these plates which confronts the food product has flared perforations that guide, direct, and concentrate a wash of hot air onto the surface of the food product. The space between the parallel plates is part of the air stream flow path, and provides an efficient flow path which is generally free of turbulence. The lower perforated plate also serves as a crumb tray.

Preferred embodiments of the invention will be understood best from the following specification, taken with the attached drawings, in which:

FIG. 3 is a perspective view of a side and front of an air flow member unit having a perforated plate on a side facing a food product in order to guide, direct, and concentrate an air stream;

FIG. 4 is a cross section of a perforation taken along line 4—4 of FIG. 3;

Figure 1:
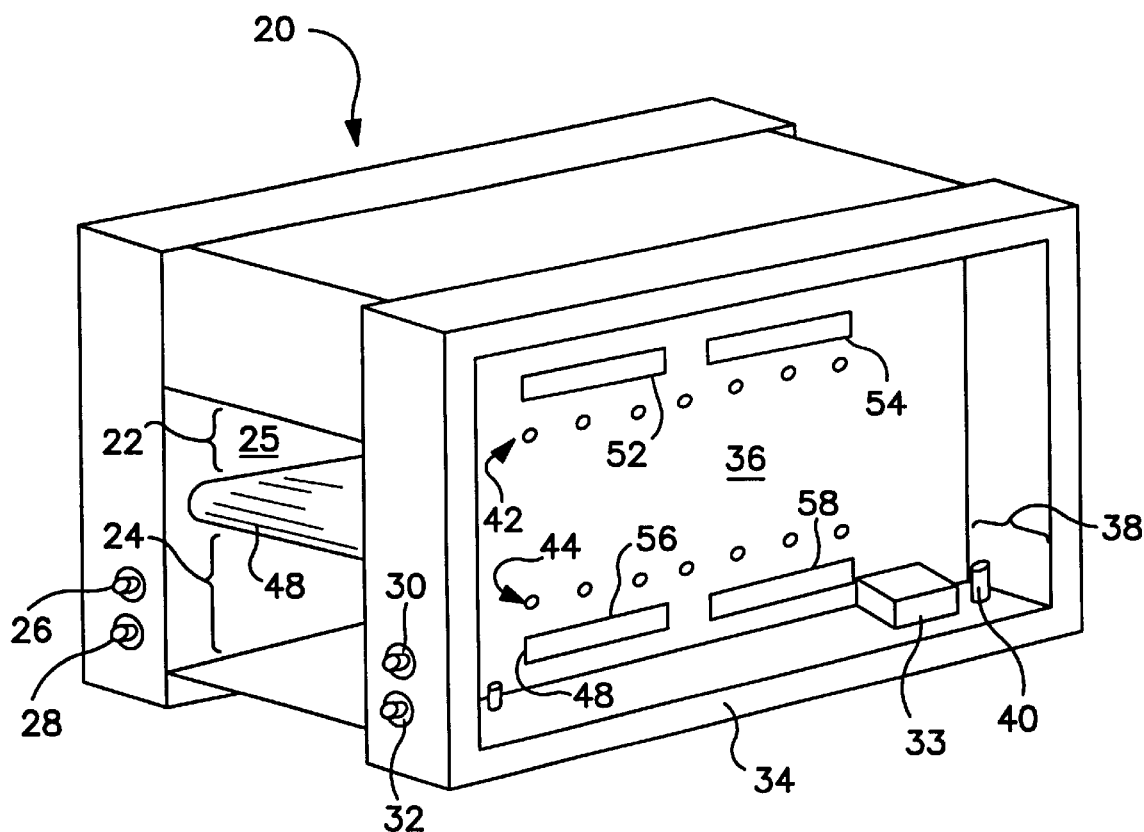
FIG. 1 is a perspective view of the front and one side of the toaster oven with a side plate of an outer housing removed in order to show the inner construction.

FIG. 1 is a perspective view of the inventive oven 20 having an input opening 22 for receiving a food product and an output opening 24 for delivering a food product after it is toasted or otherwise heated. Taken together, the openings 22, 24 define one end of an oven cavity 25. The remainder of the oven cavity 25 is defined by internal side walls and a back wall. The heat in the oven cavity is controlled by two knobs 26, 28 which turn on and off upper and lower heaters, respectively. Two other knobs 30, 32 control the amount of energy supplied to (and therefore the heat produced by) the upper and lower heaters, respectively. For most ovens, a simple rheostat is usually a satisfactory device to be controlled by the switch 30 or 32. Therefore, the upper and lower heaters are individually selected by switches 26, 28. In turn, the amounts of radiant heat that the upper and lower heaters supply are individually controlled by dials or knobs 30, 32. Any other suitable means 33 may be provided to further control the energy. For example, a microprocessor controlled circuit may sometimes be desirable if a schedule of heating temperatures is desired.

In greater detail, FIG. 1 shows the oven with the right hand side panel (a sheet of metal) removed in order to display the internal construction. Usually, this side panel is attached by bolts to a frame 34 surrounding the housing at the outer side of the opening. Hence, the housing has double (inside and outside) walls, the inside wall 36 forming one side of an air passage way and the side panel (not shown) that is removed forming the other side of the passage way. The inside wall 36 also forms one side of the heating cavity. Thus, the space 38 between the walls is provided for the air flow which cools the outside panel to the touch. The screw 40 has a foot pad (not shown) to provide an adjustment for leveling the oven.

Radiant heat is provided by upper and lower "Calrod" elements 42, 44 for suitably heating the top and bottom, respectively, of the food product. The food product itself rests on a conveyor belt 48 which travels between "Calrod" elements 42, 44 and at a speed coordinated with the oven heat so that the food product is properly cooked when it reaches the far end of conveyor 48 and drops onto a slide that returns the food product to space 24. Preferably, the conveyor 48 is a wire link conveyor.

Air vents 52, 54 are formed above upper "Calrod" heating elements 42. Air vents 56, 58 are formed below lower "Calrod" heating elements 44. These vents enable the air stream in space 38 to enter into the oven cavity and to travel over the heating elements 42, 44 and impinge upon the food product being carried by conveyor 48.

Figure 2:
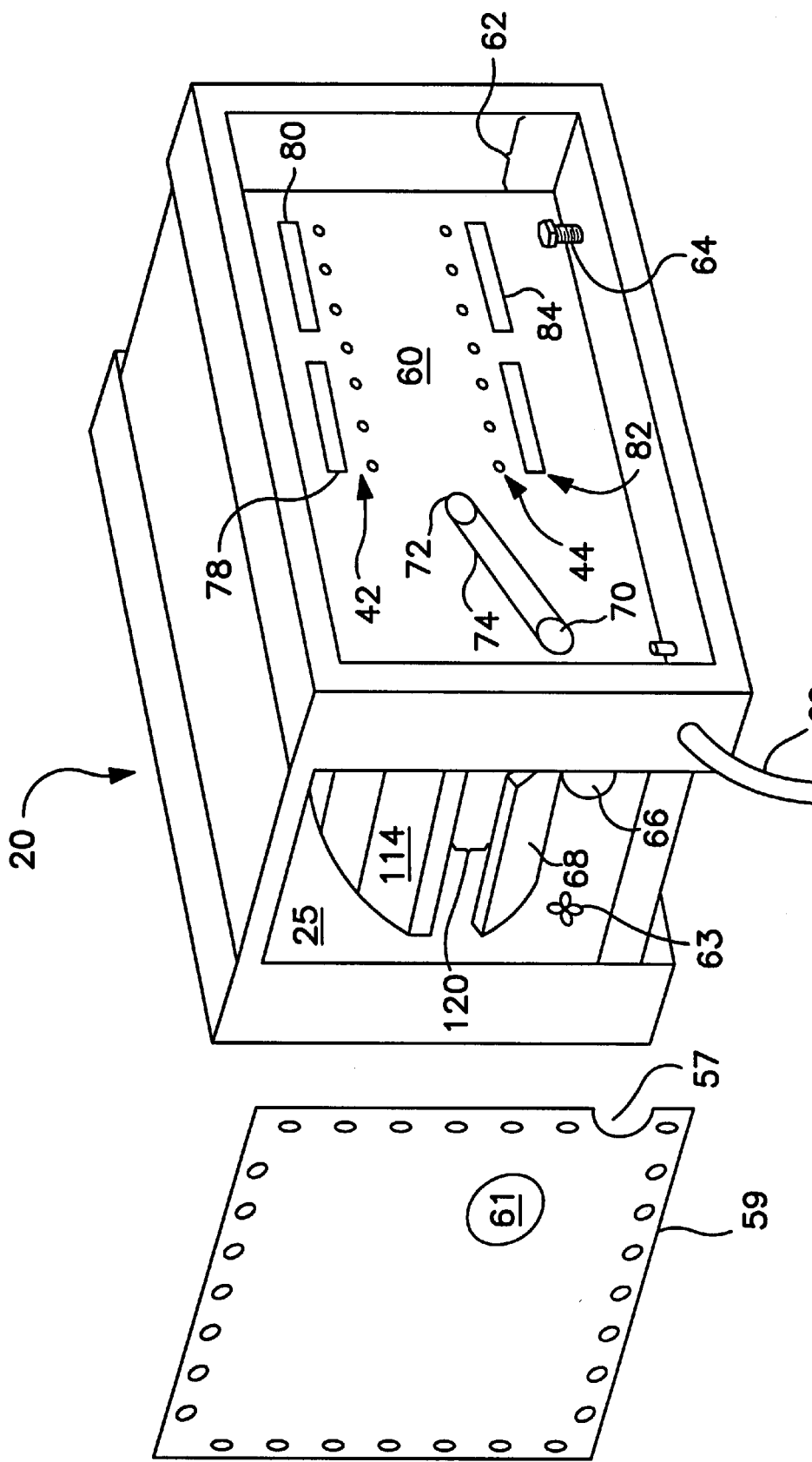
FIG. 2 is a perspective view of the back and opposite side of the toaster oven, with a back plate and an opposite side plate of an outer housing removed in order to show the inner construction.

The opposite side and back of oven 20 are shown in FIG. 2. The side and back panels (sheets of metal) are removed so that the internal oven construction may be seen. The side wall 60 (FIG. 2) and side wall 36 (FIG. 1) are parts of the inner housing forming heating cavity 25. A notch 57 in back panel 59 gives access for electrical power cable 69. The back panel includes an opening 61 for admitting the air which becomes the air stream that a fan 63 drives through the toaster oven.

Again, an air flow space 62 is located between inner housing wall 60 and the side panel that has been removed. A threaded screw 64 with a foot pad thereon (not shown) provides an adjustment for leveling the oven.

A motor 66 is mounted inside the back of the oven and under an air stream baffle or deflector 68 which is also a return chute for a cooked food product. Motor 66 is energized via electrical power cable 69. The motor 66 drives a sprocket wheel 70 coupled to a second and driven sprocket 72 via a bicycle chain 74. As long as sprocket wheel 70 drives chain 74 and turns sprocket wheel 72, the conveyor 48 (FIG. 1) is running to carry a food product through the oven. Motor 66 also turns fan 63 which draws in fresh air via opening 61 and drives the air stream.

Inside the air stream space 62 are the ends of upper and lower "Calrod" heating elements 42, 44 (the opposite ends of these elements being seen in FIG. 1). Hence, the "Calrod" rods extend across the heating cavity, perpendicular to the direction in which the conveyor 48 moves. Likewise, the inner side wall 60 has vents 78–84 corresponding to vents 52–58 on the opposite inner side wall 36 (FIG. 1). These vents admit the air stream into the heated cavity 25 containing the conveyor 48.

FIG. 3 shows an air diverter or air flow member unit 88. One of these air flow diverter units is located inside the heated cavity 25 and installed confronting each one of the vents 52–58 and 78–84. Stated another way, there are eight air diverter or air flow members 88, each adjacent an individually associated vent. Together, the air flow members line upper and lower sides of a path through the toaster oven. The conveyor 48 carries the food product along this path. Hence, the fan 63 draws in fresh air and drives an air stream through the spaces 38 and 62 between inner and outer walls, and on into the vents 52–58, 78–84, through the air flow member units 88, and out a plurality of perforations 90 on a surface of air flow members 88.

In greater detail, the air diverter or air flow member 88 is formed by two spaced parallel plates 92, 94 with longitudinal dividers between them which create three (in this example) air channels 104, 106, 108 through which the air stream flows, as shown by arrows A.

The spaced parallel plate 92 facing the food product has a plurality of perforations uniformly distributed across the surface thereof. However, it should be understood that the perforations may be also be distributed in any suitable pattern on the surface of plate 92. The distribution pattern of the perforations should be such that the confronting surface of the food product is uniformly painted with a somewhat sheet-like film or layer of hot air.

In the position shown in FIG. 3, the air diverter or air flow member is at one of the lower vents 56, 58 or 82, 84. Hence, the air flowing through the perforations 90 in FIG. 3 are directed upwardly toward the bottom surface of the food product on conveyor 48. In this lower position, the air flow members 88 also serve as a crumb tray. The air flow members 88 will be inverted if they are above the food product and at an upper vent 52, 54 or 78, 80. Then, the perforations 90 face downwardly and cause the air flow to be directed downwardly toward the upper surface of the food product on conveyor 48.

In FIG. 4, arrow B, shows the air traveling through a perforation 90. There is a somewhat funnel shape 110 in the metal surrounding each perforation. The large end of the funnel opening into the interior space between plate 92, 94 which will tend to concentrate the air stream emerging from the perforation 90 at the small end of the funnel.

Figure 5:
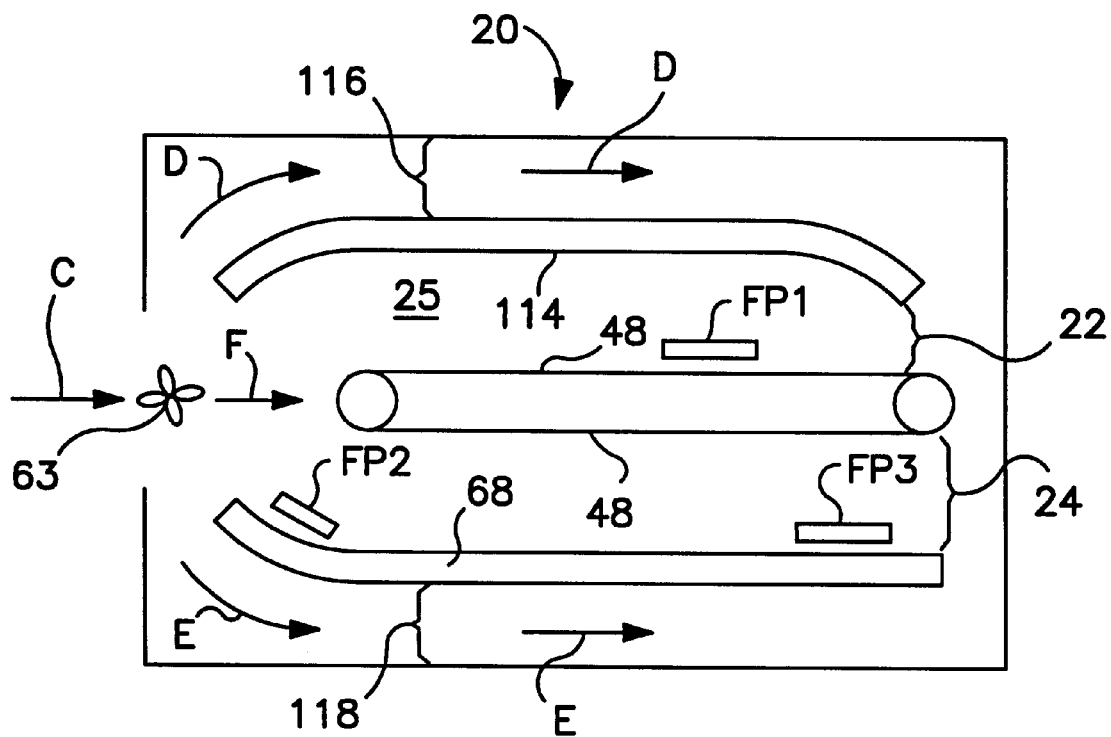
FIG. 5 is a schematic longitudinal cross section of the toaster oven showing an air flow path inside the oven.

FIG. 5 is a schematic diagram of a vertical cross section of the oven showing the relationship between the conveyor 48 and baffels 68, 114 which define upper and lower air flow spaces 116 and 118. Thus, fan 63 sucks in fresh air (arrow C) and blows it into the oven where it divides into streams flowing above (arrow D) and below (arrow E) the baffles and also into a stream flowing directly onto the conveyor and directly onto conveyor 48 (arrow F).

The lower baffle 68 also serves as a chute for returning a cooked food product to space 24 at the front of the housing 20. For example, a food product at position FP1 is being cooked by both radiant and hot air as conveyor 48 carries it through the oven cavity. At the end of the conveyor, the food product drops onto the baffle or chute 68 as shown at position FP2. The shape of the baffle and the energy imparted by the fall from the conveyor 48 causes the cooked food product to slide to space 24 at the front of the oven, as shown at position FP3. A waiter or other worker picks up the product at 24 and delivers it to the customer.

Figures 6, 6A:
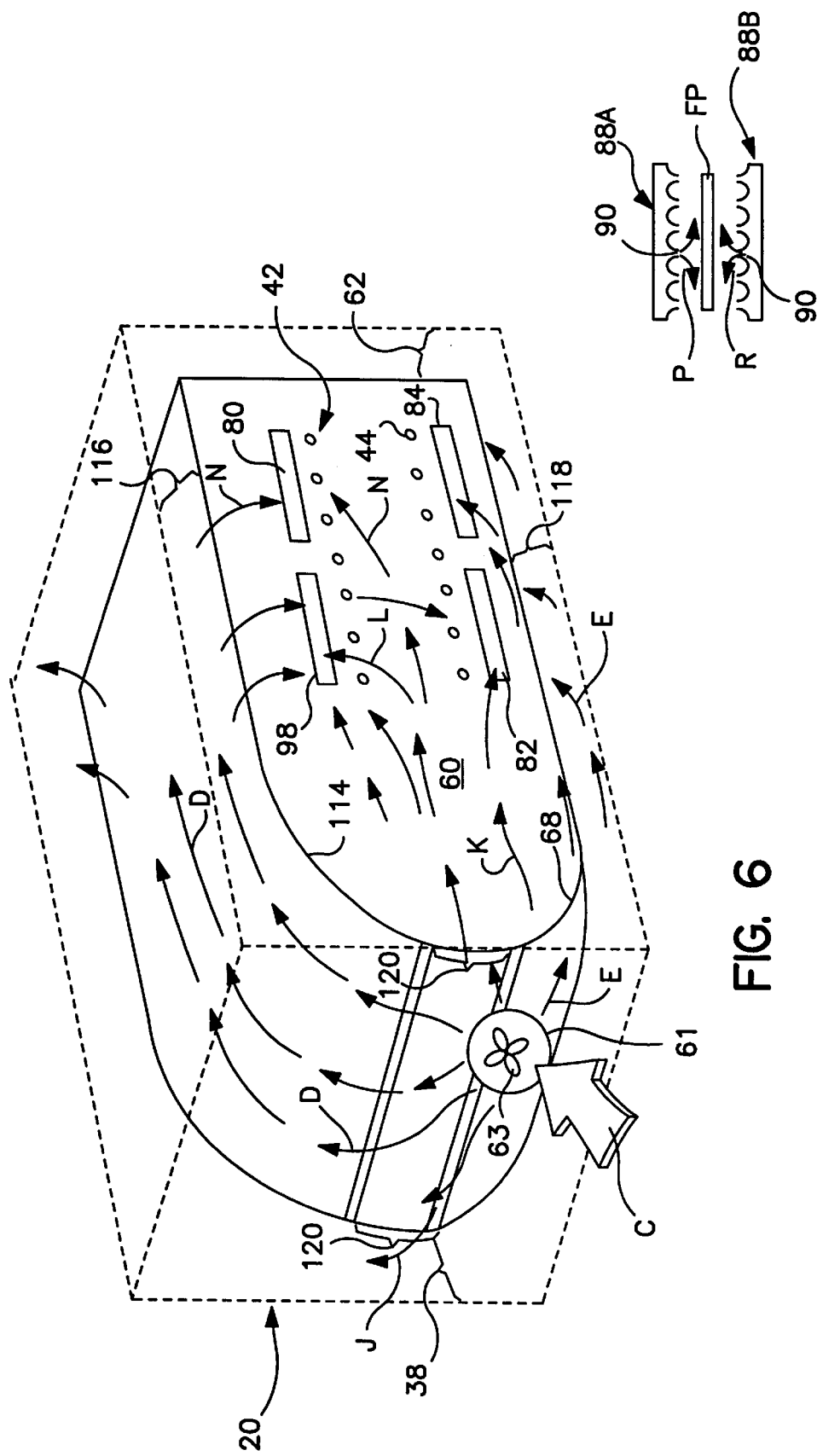
FIG. 6 is a schematic perspective view showing the air flow pattern in the embodiment of FIGS. 1–5.
FIG. 6A shows a hot sheet-like film of air painting the surface of a food product.

FIG. 6 shows the complete pattern of air flow in the housing of the oven 20. The outer housing is shown in dot-dashed lines. The inner housing is shown in solid lines with some parts omitted in the interest of clarity. The fan 63 sucks in a fresh air stream C which spreads in many directions. Some air goes over upper baffle 114 and through space 116, as shown by arrow D. Some air goes under baffle 68, as shown by arrow E. Other air goes around both sides 36, 60 of the inner housing and through the spaces 38, 62, as shown by arrows J and K. Regardless of the path followed most of the air stream finds its way into the vents, 52–58 and 78–84, as shown by arrows L–N. Some air will also pass through space 120 between the front end of the baffles 68, 114, and over the conveyor 48 (not seen in FIG. 6).

FIG. 6A shows a food product FP, such as toast, passing between upper and lower air diverters or air stream members units 88A, 88B (see FIG. 3) respectively. As it does, the air streams pass out each of the perforations 90 and paint a film or layer of hot air on the upper and lower surfaces of the food product FP, as shown by arrows P, R. If the food product should be buns, for example, only the lower heating elements 44 would be turned on so that the heated air R bathes only the lower surface. The upper heating elements 42 would not be turned on so that the air P applied over the top of the bun would have only a moderate amount of heat which is picked up from the environment as the air stream moves through the oven.

Figure 7:
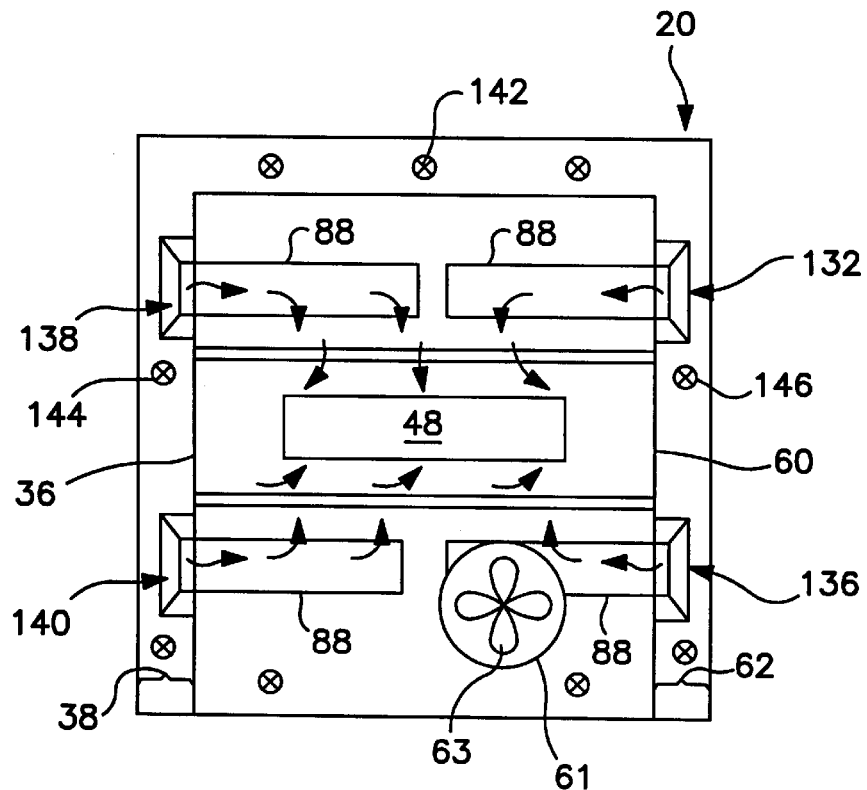
FIG. 7 is a schematic view of the back of a second embodiment of a toaster/oven.
Figure 8:
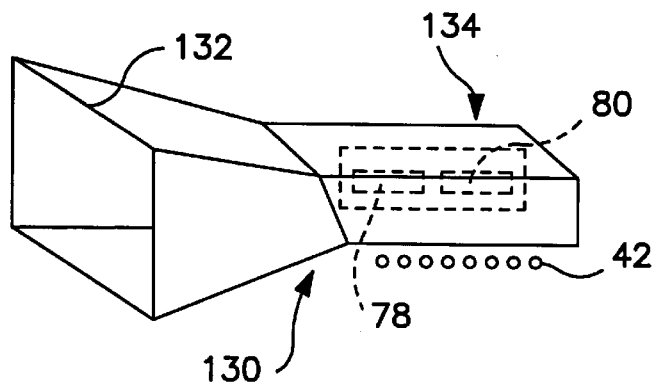
FIG. 8 is a perspective view of a hot air penum used in the second embodiment of FIG. 7.

FIGS. 7 and 8 show a modification which use a plenum to drive more of the air stream into the vents 52–58 and 78–84. Plenum 130 (FIG. 8) is a duct having a flared end 132 for guiding and directing the air stream into a manifold end 134 positioned over the two of the vents such as 78, 80, for example. The cross sectional area of the flared end 132 is much greater than the cross sectional area of the manifold end 134, thereby concentrating the flowing air stream as it moves into vents 78, 80 and beyond.

The plenum 134 is duplicated at upper and lower positions on each side of the inner oven housing, as shown in FIG. 7 at 132, 136, 138, and 140. Encircled "x" marks 142, 144, 146 are tail feathers of arrows indicating air flow into and through the space in the oven wall.

The advantages of the inventive toaster oven is its simplicity, ability to heat and toast at different heat levels and selectively heating either the top or bottom or both sides of the food product. The cost of the toaster oven is relatively low, as compared to other toaster ovens.

Those who are skilled in the art will readily perceive various modifications which may be made in the invention. Accordingly, the appended claims are to be construed to include all equivalents falling within the scope and spirit of the invention.

The claimed invention is:

1. A conveyor toaster oven comprising a double wall housing having an inner housing and an outer housing with a space between the walls thereof for conveying a stream of air, a conveyor means for transporting a food product through said housing, upper and lower heater means positioned above and below said conveyor for heating a food product, a plurality of vents in the walls of said inner housing, said vents being positioned above the upper heating means and below the lower heating means, and an air stream diverter means individually associated with each of said vents, each of said air stream diverter means having a perforated surface confronting said conveyor for directing a concentrated stream of diverted air over said heating means and onto said food product.

2. The toaster oven of claim 1 wherein each of said air stream diverter means further comprising a pair of spaced parallel plates with said perforations distributed over one of said plates, said spaced parallel plates being positioned against its associated vent so that diverted air is forced through a space between said plates and out said perforations.

3. The toaster oven of claim 2 wherein said one plate on each of said air stream diverter means has a somewhat funnel shape surrounding each perforation for concentrating a diverted air stream emerging from the perforation.

4. The toaster oven of claim 3 wherein said vents and air stream diverter means are located a distance from said conveyor, whereby said diverted air stream paints the surface of said food product on said conveyor.

5. The toaster of claim 4 and means for individually controlling said upper and lower heating means, whereby either or both sides of a food product on said conveyor means may selectively be heated by said concentrated stream of diverted air.

6. The toaster oven of claim 4 and plenum means associated with said vents for guiding and directing said air stream from said space between the walls into said vents.

7. The toaster oven of claim 2 and means in the space between said parallel plates for forming a plurality of channels through said air stream diverter means to an individually associated group of said perforation.

8. The toaster oven of claim 2 wherein said conveyor has two ends and means at a front of said housing and near one end of said conveyor for receiving a food product and means at the other end of said conveyor for returning said food product to said front of said housing.

9. A conveyor toaster oven comprising an outer housing with an open front and closed back, said housing having opposite spaced parallel side walls defining air flow spaces between them, said housing further having a pair of baffles generally parallel to upper and lower sides of said outer housing respectively defining upper and lower air flow spaces, inner ones of said spaced sidewalls and said baffles together forming an inner housing defining a heating cavity, means for driving an air stream through said spaces between said sidewalls and between said baffles and upper and lower sides of said housing, means for supporting a food product in said cavity, means for diverting air from said spaces and onto said food product in order to paint the surface thereof with a film of said diverted air, said air diverting means having spaced parallel plates with perforations on one of said plates, and means for supporting said air diverting means adjacent openings in said inner housing, said openings and said pair of spaced parallel plates being oriented so that air flow in said spaces is diverted through a space between said parallel plates and out said perforations.

10. The oven of claim 9 wherein there are a plurality of said openings and said air diverting means having a pair of space parallel plates, each of said spaced parallel plates being individually associated a corresponding one of said openings.

11. The toaster oven of claim 10 wherein said openings and spaced parallel plates are arranged above and below said food product whereby said air flowing out of said perforations is directed toward both top and bottom of said food product, each of said perforation being somewhat funnel shape in order to concentrate said air flowing out said perforations.

12. The toaster oven of claim 11 and heater means interposed between said spaced parallel plates and said top and bottom of said food products whereby said air directed toward said food product is hot air warmed by said heater means.

13. The toaster oven of claim 12 and means for separately controlling the heat of said heater means for individually adjusting the heat of air directed toward the top and toward the bottom of said food product.

14. The toaster oven of claim 13 wherein said means for supporting said food product is a wire link conveyor belt, and means for coordinating the heat and the speed of the conveyor for driving said conveyor at a speed which correctly cooks said food product during the time period while it is transported through said oven.

15. An air stream diverter for use in a conveyor oven, said diverter comprising a pair of spaced parallel plates having perforations in only one of said plates, longitudinal dividers between the create uniform distribution of air over the surface of the perforated plate, said perforations being somewhat funnel shape in order to collect and concentrate air flowing out said perforation, means for driving air through space between said plates and out said perforations, and means for supporting a food product in a path of said air stream flowing out said perforations, whereby the air driven out said perforations paints the surface of said food product.

16. The diverter of claim 15 and means for selectively heating said air stream flowing out said perforations and toward said food product.

17. The diverter of claim 15 wherein there are a plurality of said pairs of said spaced parallel plates arranged along and on opposite side of a path, and means for moving said food product along said path at a speed which correctly cooks said food product as it moves along said path.

* * * * *